United States Patent
Hassan Al-Jaf et al.

(10) Patent No.: US 12,149,126 B2
(45) Date of Patent: Nov. 19, 2024

(54) SURFACE PERMANENT MAGNET MOTOR

(71) Applicant: ZF Automotive UK Limited, Solihull (GB)

(72) Inventors: Ari Akbar Hassan Al-Jaf, Birmingham (GB); David Moule, Birmingham (GB); Barrie Charles Mecrow, Northumberland (GB)

(73) Assignee: ZF AUTOMOTIVE UK LIMITED, Solihull (GB)

( * ) Notice: Subject to any disclaimer, the term of this patent is extended or adjusted under 35 U.S.C. 154(b) by 0 days.

(21) Appl. No.: 17/857,199

(22) Filed: Jul. 5, 2022

(65) Prior Publication Data
US 2023/0006491 A1    Jan. 5, 2023

(51) Int. Cl.
| | |
|---|---|
| *H02K 1/2781* | (2022.01) |
| *H02K 1/16* | (2006.01) |
| *H02K 1/30* | (2006.01) |

(52) U.S. Cl.
CPC ........... *H02K 1/2781* (2022.01); *H02K 1/165* (2013.01); *H02K 1/30* (2013.01)

(58) Field of Classification Search
CPC .......... H02K 1/165; H02K 1/30; H02K 21/16; H02K 1/2733; H02K 1/2746; H02K 1/278; H02K 1/2786; H02K 7/14; H02K 15/03; H02K 2213/03; H02K 1/02;
(Continued)

(56) References Cited

U.S. PATENT DOCUMENTS

| | | | | |
|---|---|---|---|---|
| 8,234,776 | B2 * | 8/2012 | Lopez | H02K 1/276 310/156.55 |
| 11,139,765 | B1 | 10/2021 | Govindu et al. | |
| 2016/0294235 | A1 * | 10/2016 | Takizawa | B62D 5/0424 |

(Continued)

FOREIGN PATENT DOCUMENTS

| | | |
|---|---|---|
| CN | 209016816 U | 6/2019 |
| GB | 2468718 A | 9/2010 |

OTHER PUBLICATIONS

GB Search Report for corresponding GB Application Serial No. 2109703.5, dated Apr. 6, 2022, 1 page.
(Continued)

*Primary Examiner* — Christopher M Koehler
*Assistant Examiner* — Riley Owen Stout
(74) *Attorney, Agent, or Firm* — Tarolli, Sundheim, Covell & Tummino LLP

(57) ABSTRACT

A surface mounted permanent magnet motor includes a stator having poles and windings. A rotor includes magnets fixed to an outer surface of a support assembly. The stator poles face the outer surface of the rotor. The support assembly has magnetically conductive magnet carriers spaced from each other and supporting two magnets of opposing polarity. The magnet carriers have a central region of low permeability that blocks q-axis flux flowing from the stator radially towards the rotor axis surrounded by regions of high permeability. A first high permeability region defines a continuous flux path on the side of the barrier region closest to the rotor axis and links central regions of the two magnets carried by the magnet carriers. A second high permeability region is located on the side of the barrier nearest the stator that defines a flux path linking the end regions of the magnets.

15 Claims, 7 Drawing Sheets

(58) Field of Classification Search
CPC ... H02K 2201/06; H01F 41/028; H01F 7/021; C22C 2202/02
See application file for complete search history.

(56) References Cited

U.S. PATENT DOCUMENTS

| | | | |
|---|---|---|---|
| 2019/0386531 A1* | 12/2019 | Shrestha | H02K 1/30 |
| 2020/0083768 A1* | 3/2020 | Yim | H02K 1/2766 |
| 2021/0050755 A1* | 2/2021 | Morisco | H02K 15/10 |

OTHER PUBLICATIONS

Hendershot, Chapter 4.4.2 and 4.6 of "Design of Brushless Permanent-Magnet Machine" by J. R. Hendershot and T. J. E. Miller, Motor Design Books LLC, ISBN 978-0-9840687-0-8.
Krishnan, Chapter 4.2 of "Permanent magnet synchronous and brushless DC Motor Drives" by R. Krishnan, CRC Press, ISBN 978-0-8247-5384-9.
Lipo, Chapters 3.11 "Power Input" and 3.12 "Torque Equation" of "Analysis of Synchronous Machines" by T. A. Lipo, 2nd Edition, CRC Press, ISBN 978-1-4398-8067-8.

* cited by examiner

SURFACE PERMANENT MAGNET MOTOR

RELATED APPLICATIONS

This application claims priority from GB Patent Application 2109703.5, filed 5 Jul. 2021, the entirety of which is hereby incorporated herein by reference.

TECHNICAL FIELD

This invention relates to improvements in surface mounted permanent magnet motors.

BACKGROUND

A surface mounted permanent magnet motor, SPM, is an electric motor that has a plurality of permanent magnets mounted to a surface of the rotor that generate a permanent flux. The motor has a stator that includes a plurality of teeth, usually of ferromagnetic material, around which conductors are wound to form coils. These conductors are connected to a power supply most commonly as three independent phases. Torque is generated by passing suitable current through the wires of the stator, generating a flux in the coils that interacts with the flux of the rotor magnets.

To appreciate how the magnetic fluxes in the motor interact consider a simple SPM with one North pole and one South pole arranged on diametrically opposed sides of the axis of rotation of a cylindrical rotor. The stator comprises a set of teeth supporting a winding pitched such that it creates an appropriate number of north and south poles to interact with the rotor pole number. This may be achieved by winding a coil of wire wrapped around each tooth although other arrangements are possible. The motor generates the most torque when the flux linked between the stator windings and the rotor magnets is in quadrature, a so called q axis orientation and generates zero torque when the stator flux is aligned with the two rotor magnets, a so called d axis orientation. Starting from a position where the flux lies on the q axis, the rotor will turn until it is aligned with the d-axis when it will stop rotating. The rotor can be made to rotate continuously by rotating the stator flux around by applying suitable voltage waveforms to the coils.

In a practical SPM, the rotor will often comprise multiple North poles alternated with South poles spaced around the surface of the rotor, and the stator will comprise multiple teeth spaced around the stator. In this case the motor rotor may be considered to lie on the q axis when the centre of each North and South pole generated by the stator winding are aligned with a gap between adjacent North and South magnets of the rotor, and aligned with the d axis when the centre of magnets of the Rotor and aligned with the centre of corresponding polarity magnets of the stator.

One problem that SPM motors suffer from is cogging torque, which causes the motor to generate unwanted variations is torque as it rotates. This is caused by the interaction between the stator and the rotor which the rotor tries to align and stay stationary between the rotor magnets and the ferromagnetic teeth of the stator. Modifying the shape of the stator teeth or the shape and profile of the rotor magnets can help in reducing the magnitude and harmonic content of cogging torque.

Another problem that is inherent in all permanent magnet motors is the impact of a failure of a phase of the stator windings. This may be a fault in a motor drive stage that applies the currents that flow in the phases, or a break in a winding. Such a fault can lead to a complete loss of motoring.

A known solution is to wind the stator coils as two or more separate sets of motor phases, each set commonly referred to as a lane. In this solution if one lane has a fault one or more other lanes can be used to keep the motor operating either at full capacity or in a reduced capacity.

A more problematic fault occurs where a phase winding is shorted out, as rotation of the motor rotor will generate a voltage that in turn causes a current to flow in that phase. This can cause excessive heat to build up if the motor continues to rotate. The impact of such a fault mode can be reduced by providing a motor with a high q-axis inductance, but having a high Q-axis inductance will cause the motor to run out of voltage at a lower speed compared with an identical motor with a low q-axis inductance. On the other hand a high d-axis inductance may be beneficial but in many prior art motors it is not possible to increase the d-axis inductance, for instance by increasing the number of turns of the stator winding, without a proportionate increase in q-axis inductance.

SUMMARY

An object of the present invention is to provide a surface mounted permanent magnet motor having a high inductance that limits the short circuit drag torque whilst providing good power levels over a wide range of motor speeds.

According to a first aspect the invention provides a surface mounted permanent magnet (SPM) motor comprising:

a stator comprising a plurality of poles and a plurality of stator a rotor comprising a generally cylindrical support assembly and a plurality of permanent magnets, in which each permanent magnet is fixed to the outer surface of the support assembly, the rotor and stator being positioned about a common axis such that the stator poles face the outer surface of the rotor and the rotor can rotate around the shared axis, in which the support assembly comprises a plurality of magnetically conductive magnet carriers, each circumferentially spaced from an adjacent magnet carrier, the magnet carriers each having a curved outer face that provides a segment of the cylindrical outer face of the support assembly each magnet being supported by two adjacent magnet carriers and each magnet carrier supporting at least two magnets of opposite polarity, in which each of the magnet carriers comprises a central flux barrier region of relatively low magnetic permeability that blocks q-axis flux flowing from the stator radially towards the rotor axis surrounded by regions of relatively high permeability, a first one of those high permeability regions defining a continuous flux path that extends on the side of the barrier region closest to the rotor axis and links a central region of each of the two magnets carried by the magnet carriers, and a second one of the high permeability regions being located on the side of the barrier nearest the stator that defines a flux path that links the end regions of the two magnets.

The flux barrier may be V-shaped or part circular in shape when viewed along the axis of the rotor, with one end of the barrier region being located close to an underside of one of the magnets supported by the magnet support piece and the other end located close to the underside of the other magnet supported by the magnet support piece. Each end of the barrier may be spaced from the underside of a magnet by as small a distance as possible whilst maintaining sufficient strength in the surface of the magnet support piece to physically support the magnet.

In turn the first region of relatively high permeability may also be V-shaped or of part circular shape to compliment the shape of the barrier region, an edge of the first region defining an innermost peripheral edge of the magnet support piece. This region may be of substantially uniform width along a major part of its length, and preferably the total width of the magnet carriers under a magnet may be close to the stator tooth width+/−10% once saturation flux density considered. The width of the first region may be at least equal to an up to twice as wide as the barrier or perhaps three times or more.

Providing a V-shaped or part circular first region of high permeability along which beneficial d-axis flux may pass makes it harder for q-axis flux to link from one magnet carrier to the adjacent magnet carrier due to the resulting large air gap between them as the edges of the magnet carriers taper away from each other.

The apex of the barrier region where V-shaped, or centre of the barrier region where part circular, may be substantially aligned radially with the centre of the gap between the two magnets supported by the magnet support piece.

The second region maybe include a further barrier region between the radially outer surface of the magnet carrier and the barrier region, and this further barrier region may be of relatively low permeability.

The further barrier region may be hole, preferably circular, cut out of the magnet support piece.

The further barrier and the barrier region may be coalesced at a single region comprising a u shaped or V-shaped cut out with an enlarged circular hole nestled into the base of the v shape or u-shape on the side facing the stator.

The second region of relatively high permeability may be shaped and sized such that the material of the second region is saturated in the vicinity where it contacts the corners of the magnets that are supported by the magnet support piece, limiting the q-axis flux that can flow from the stator through the corners of the magnet and into the magnet support piece. This may help in preventing demagnetisation of the corners of the magnets where high fluxes are generated at the stator.

A raised rib may be provided on the radially outer surface of the magnet carrier that protrudes partially into the space between the ends of the two magnets supported by each magnet carrier which may help with the assembly of the rotor by ensuring that the pieces can be held and positioned accurately.

Each magnet carrier may comprise a laminated stack of magnet support pieces which each comprise a ferromagnetic plate.

Each of the magnet support pieces may be identical.

Each plate of the stack may be substantially identical.

Each plate may comprise a material that is the same or similar to the stator material. It may be an iron or electrical steel plate, by which we mean a steel alloy that has been processed and treated and containing 0.5% and 6% silicon.

In a preferred arrangement, each magnet carrier is separate from the other magnet carriers.

The flux barrier regions may comprise cut outs in the plates defining air gaps across which it is hard for flux to cross. Of course, instead of air gaps the regions could be infilled with other material. In one arrangement the plates may comprise material which has been treated so that it has a lower permeability in the barrier region and higher elsewhere.

Each plate may have an aligned grain 17 that defines a preferential direction along which it is easier for flux to flow than in a direction orthogonal to that direction. This grain 17 may be aligned orthogonally to the axis of rotation of the rotor when looking along the radial centre line of the plate. Use of multiple support pieces which each have an optimal alignment may provide significant benefits compared with a solid rotor which cannot have such an optimal alignment. The grain 17 will be generally aligned with the d-axis flux paths.

The material of each plate in the stack may comprise a cold rolled steel having a preferred grain orientation.

Each stack forming a magnets support piece may comprise multiple plates, for example 10 or more plates. The preferred number will depend on the thickness of plate selected and the size of the motor. Every plate may be fixed to the two magnets, or only those in the centre of the stack.

A locating feature or ligature may be provided at the apex of the V-shaped first region, aligned radially with the centre of the gap between the magnets supported by the magnet support piece.

The rotor may comprise an elongate central spine having outwardly facing sockets that engage with the locating features or ligatures of the magnet carriers. The sockets may comprise undercut slots that extend axially along a length of the spine into which the locating features can be slid. This enables the spine to support each of the magnet support pieces securely.

The spine may comprise a material that is non-ferromagnetic and may have a lower weight that would be achievable using a solid rotor core of ferromagnetic material. This low weight spine combined with the cut away magnet support pieces may form a beneficially light rotor assembly, reducing the inertia of the motor compared with a traditional surface permanent magnet motor with a solid ferromagnetic rotor assembly.

In an alternative the spine and one or more, or all of, the magnet carriers may be formed, moulded, cast or otherwise permanently joined so as to comprise one contiguous body with the magnet carriers define by protrusions that extend radially from the spine like the petals of a flower.

The provision of the separate magnet carriers with regions of high and low permeability provides for paths that can control the path taken by the flux that links the stator poles and the magnets. By suitable choice of those paths the applicant has appreciated that it is possible to block flux paths that are undesirable whilst encouraging flux to flow in a desirable direction. In particular, the rotor blocks flux flowing along the q-axis more than it does for the d-axis, allowing a high inductance to be achieved whilst maintain power at higher motor speeds.

Each magnet carrier may include a recess on the outer circumferential surface in a region that is covered by a magnet that is filled with an adhesive to fix the magnet in place. As each magnet support piece supports two magnets, there will be two such regions, one located towards each end of the barrier region.

Each magnet may have a bread loaf shape when viewed in cross section looking along the axis of the rotor, having a planar rear face that is fixed to the magnet support pieces and a curved outer surface that faces the stator, the centre of the magnet being radially thicker than the curved ends. The curving of the ends helps reduce the risk of demagnetisation of the magnet corners when combined with the beneficial saturated region of the magnet support piece adjacent the corner. Furthermore, the curving of the magnet cooperates with the stator tooth profile to minimise the cogging torque of the motor.

The stator may comprise an annular body that defines a set of inwardly directed teeth around which the stator windings are wound in a pattern that generates the right air gap flux density to couple with the rotor pole number. The skilled person will be familiar with the different winding patterns that can be used and their benefits.

BRIEF DESCRIPTION OF THE DRAWINGS

There will now be described by way of example several embodiments of the present invention with reference to and as illustrated in the accompanying drawings of which.

DESCRIPTION

Figure 1:
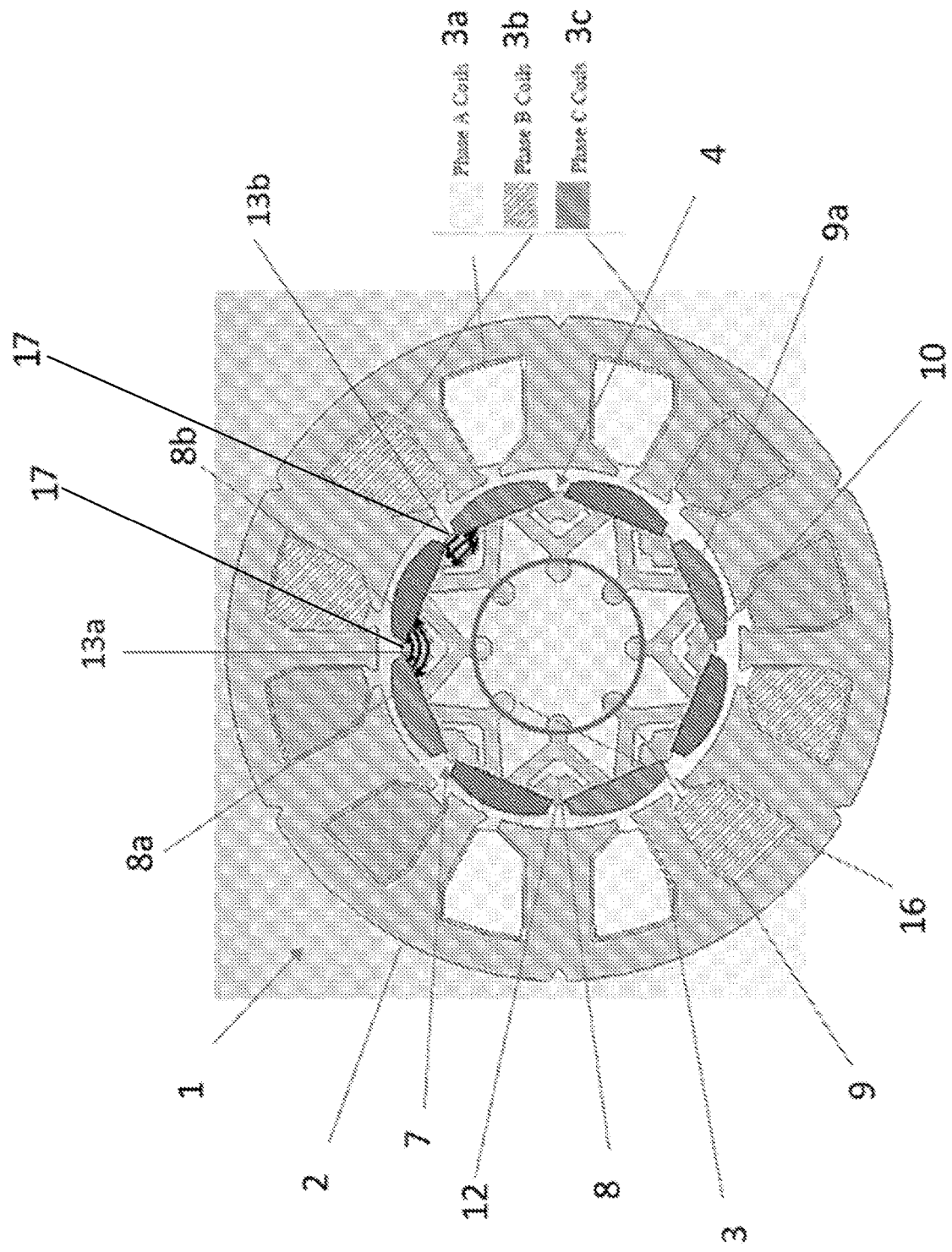
FIG. 1 is a cross section through a first embodiment of a surface mounted permanent magnet motor in accordance with the present invention.

FIG. 1 is a cross section through an exemplary surface mounted permanent magnet motor 1 viewed along the axis of the rotation of the motor 1. The motor 1 comprises an annular stator 2 that surrounds a generally cylindrical rotor 4. The length of the rotor, in conjunction with the number of turns, the current available, the properties and dimension of the magnetic circuit, is chosen according to the torque required from the motor, a longer rotor enabling more torque to be created compared to a shorter one.

Figure 2:
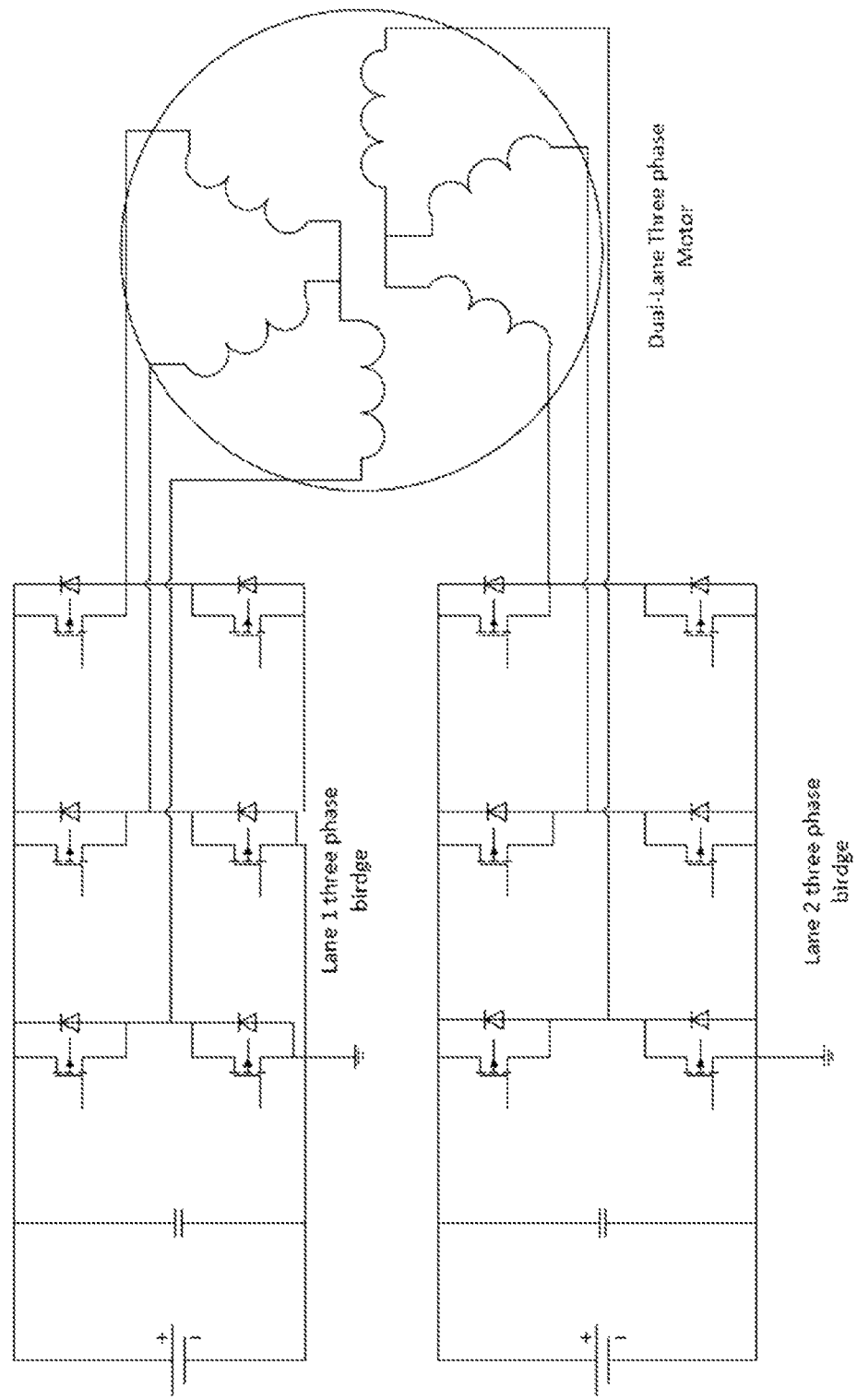
FIG. 2 is circuit diagram of a drive circuit for two three phase lanes of the motor of FIG. 1.

The stator 2 comprises an annular back iron that supports a set of inwardly facing iron teeth 3. The teeth 3 are wound with coils 3a, 3b,3c of conductive electrical wire connected into two sets of three phases A, B and C enabling the motor to operate as two independent lanes. FIG. 2 shows a typical configuration of the phases and drive circuitry for the two lanes. The invention can best be applied to a multi lane design but may also be generalised to motors having only one lane.

In this example, the stator teeth 3 are wound in a modular pattern, with a tooth separating each of the coil windings. As shown in FIG. 1 there are twelve teeth 3, alternating between a wide tooth and a narrow tooth. This helps reduce cogging torque. The skilled person will understand that the invention is not to be limited to such a winding arrangement.

The rotor 4 fits within the stator 2 and comprises a generally cylindrical support assembly 5 and a plurality of permanent magnets 6, in which each permanent magnet is fixed to the outer cylindrical surface of the support assembly 5 facing towards the stator 3. The diameter of the rotor 4 is such that the magnets 6 are spaced from the tips of the stator teeth by a small air gap. As shown, there are 8 magnets, arranged as alternating North and South poles. The magnets 6 extend around most of the circumference of the rotor with only small air gaps between adjacent magnets being provided. Other magnet arrangements are possible within the scope of the invention, such as a consequent pole motor which would have half the number of magnets with each being thicker.

Figure 7:
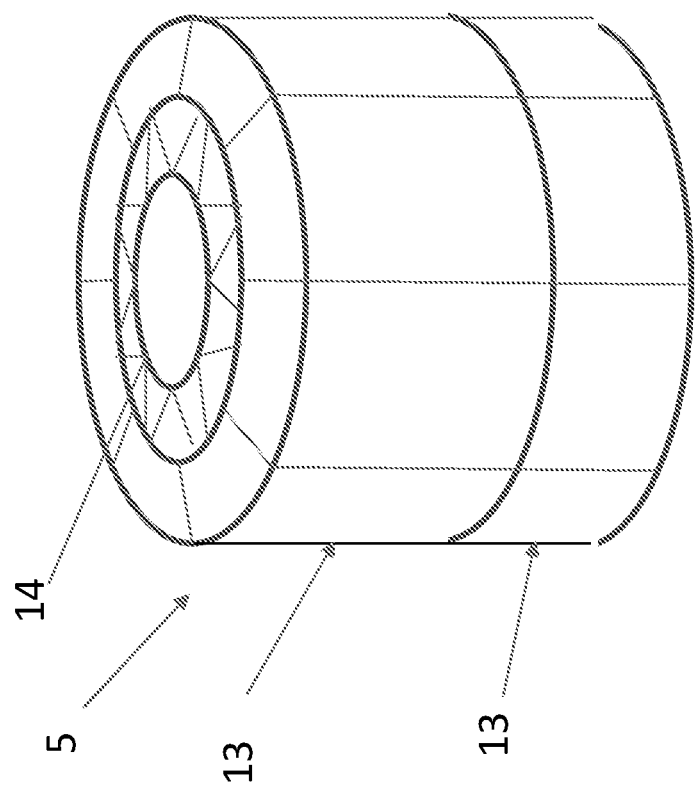
FIG. 7 shows the rotor with the magnets removed.

The support assembly shown in FIG. 7 comprises a plurality of magnetically conductive magnet carriers 7, each circumferentially spaced from an adjacent magnet carrier 7, the magnet carriers each having a curved outer face that provides a segment of the cylindrical outer face of the support assembly 5. Each magnet 6 is supported by two adjacent magnet carriers 7 and each magnet carrier supporting adjacent North and South pole magnets, so that a magnet carrier extends across and offset from the air gap between adjacent magnets. The magnets are fixed to the carriers using an adhesive which is placed in shallow recesses in the outer surface of the magnet carrier pieces. Note that there could be multiple rings of magnets along the rotor length, in which case each carrier may support two magnets (one North and one South) for each of the rings. These magnets could also be step-skewed along the rotor length, the carriers in turn being step-skewed to support these.

Each of the magnet carriers 7 comprises a set of ferromagnetic plates 13 laminated to form a stack along the axis of the rotor. FIG. 1 shows one plate or lamination of each stack as the cross section is taken midway along the length of the rotor. FIG. 7 shows a rotor with two plates but in practice there may be many more laminated to form a stack. Each plate 13 comprises an elongate curved slot defining a central barrier region 8 in the form of an air gap of relatively low permeability that blocks q-axis flux flowing from the stator radially towards the rotor axis. This slot may be formed by removing material from a solid plate, such as by wire erosion, or may be formed by building the plate around the slot using an additive manufacturing technique.

The slot is surrounded by regions 9,10 of the plate having a relatively high permeability, the plate being formed of cold rolled steel material. In this example the material is a steel alloy having a high percentage of silicon up to approximately 5 percent. A first one of those high permeability regions defines a flux path that extends on the side of the barrier region closest to the rotor axis and links a central region of each of the two magnets carried by the magnet carriers, and a second region on the side of the barrier nearest the stator that defines a flux path that links the end regions of the two magnets.

Figure 3:
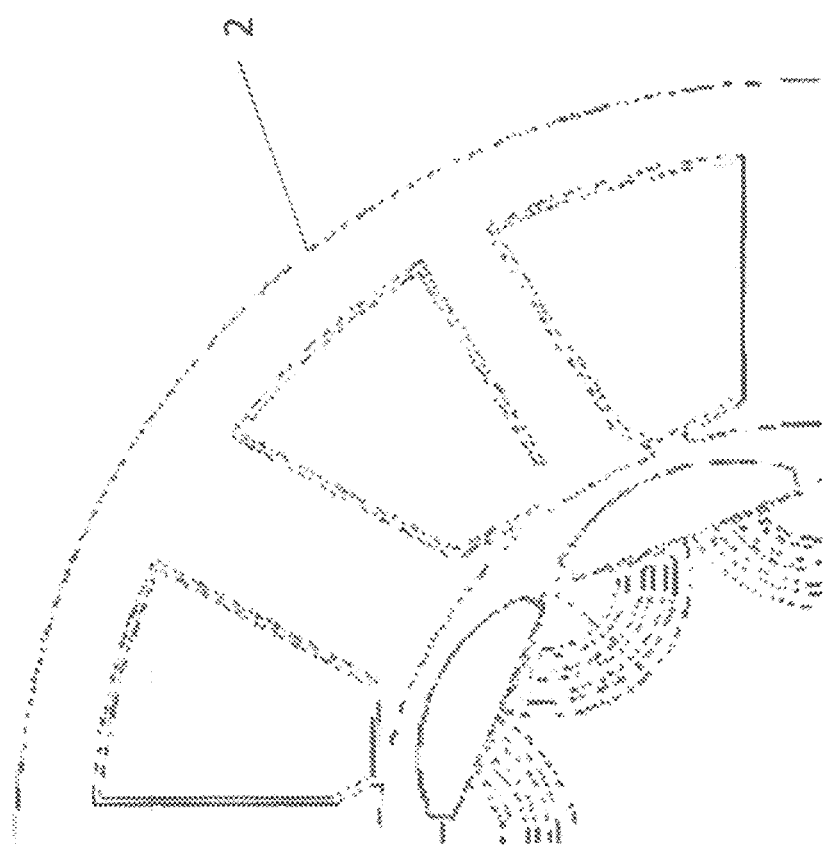
FIG. 3 is an alternative configuration of a plate of a motor magnet carrier that could be used instead of the plate shown in FIG. 1.

The barrier region 8 of the motor of FIG. 1 has a V-shape when viewed along the axis of the rotor, with one end 8a of the barrier region being located close to an underside of one of the magnets supported by the magnet support piece and the other end 8b located close to the underside of the other magnet supported by the magnet support piece. In an alternative in FIG. 3 the barrier has a part circular shape. And optionally comprises three slots arranged in parallel. The number of slots may be varied with one, two, three or more slots provided to form the barrier.

The first region 9 of relatively high permeability has a constant width and a shape that compliments the shape of the barrier region 8, an edge of the first region defining an innermost peripheral edge of the magnet support piece.

Providing a V-shaped or part circular first region 9 along which beneficial d-axis flux may pass makes it harder for flux to link from one magnet carrier to the adjacent magnet carrier due to the resulting large air gap between them in regions that do not form advantageous flux paths. The first region forms a path for the flux to flow from magnet to magnet.

Figure 4:
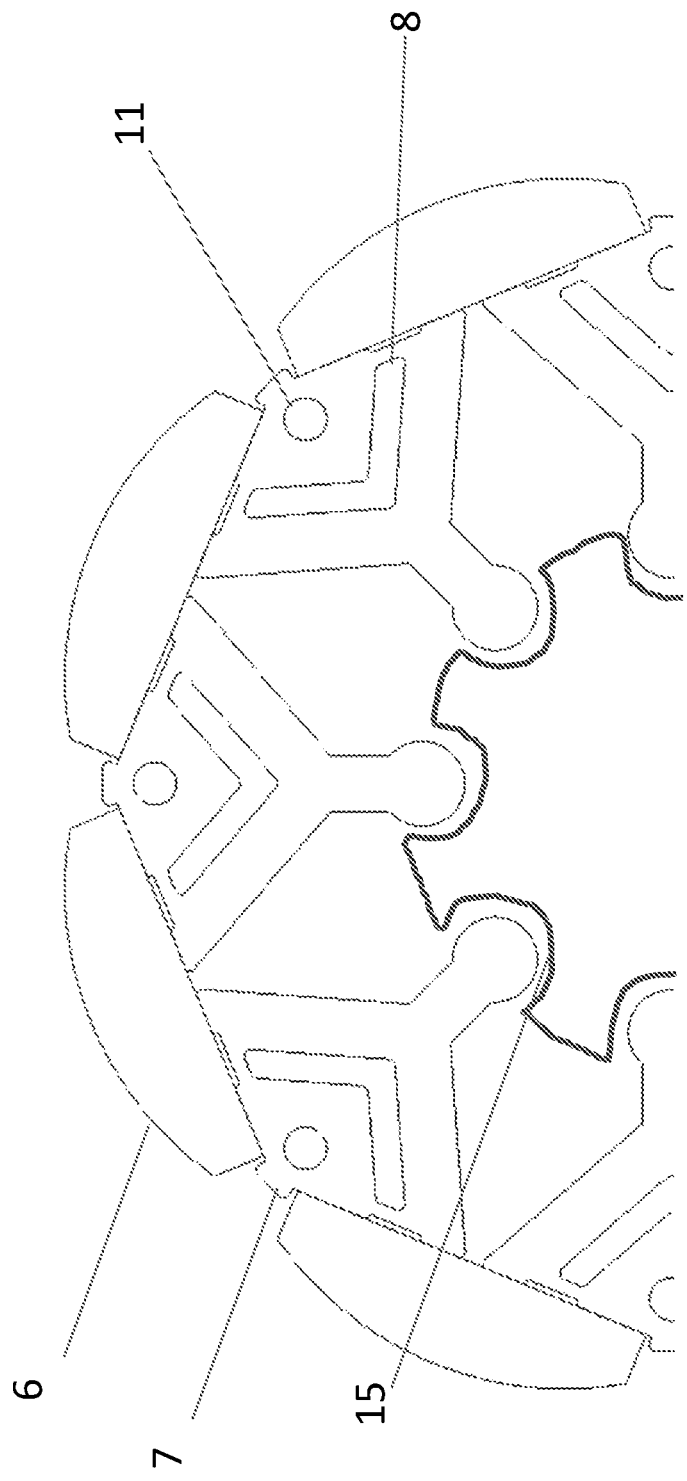
FIG. 4 is a similar view of a further alternative configuration of a motor magnet carrier that could be used in the motor of FIG. 1.
Figure 5:
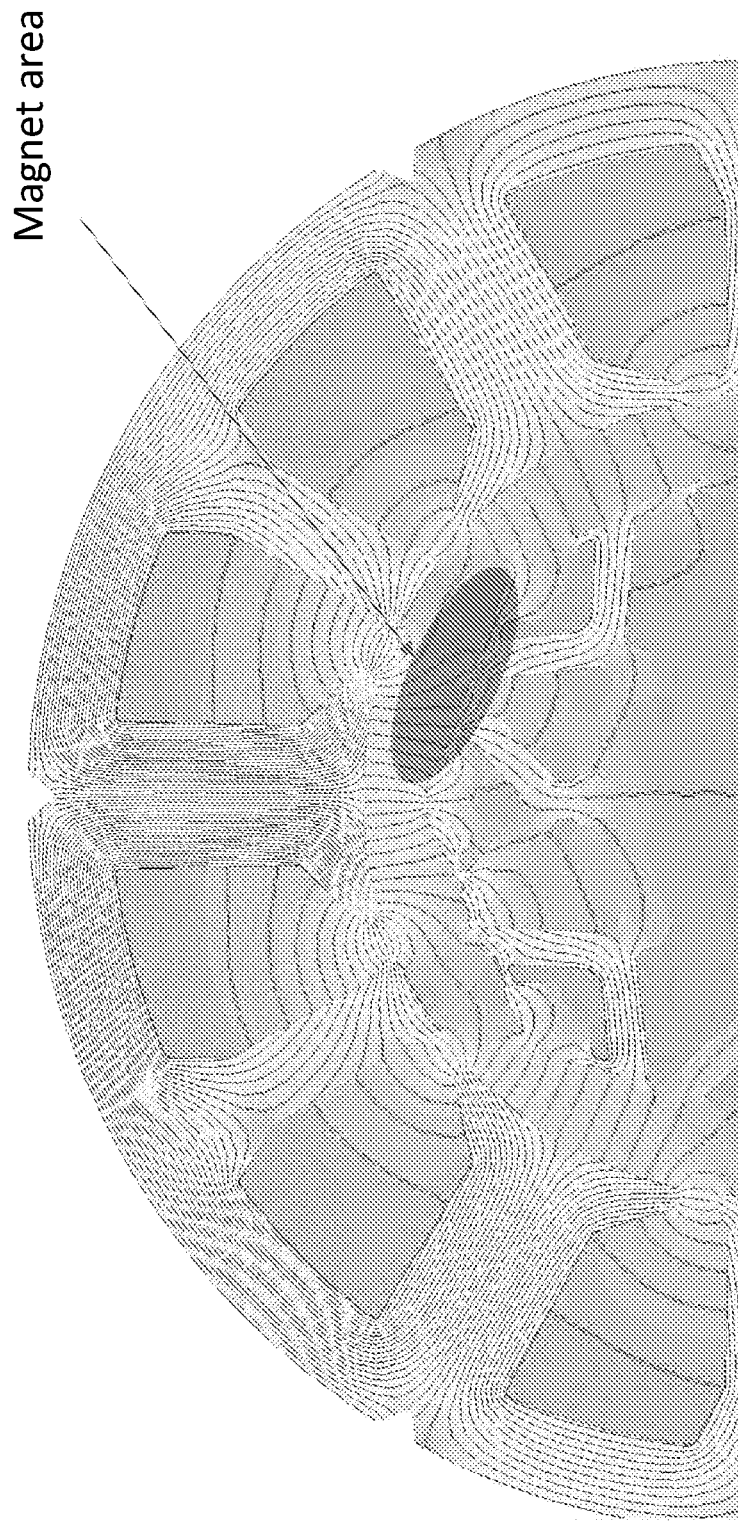
FIG. 5 shows the path taken by the stator flux in a section of the motor encompassing two magnets, the respective magnet support piece and the stator with the rotor aligned with the q-axis at which maximum torque is generated FIG. 6 show the magnetic flux density at full load and the area of potential demagnetisation and corresponding saturation of the second high permeability region of the magnet carriers.
Figure 6:
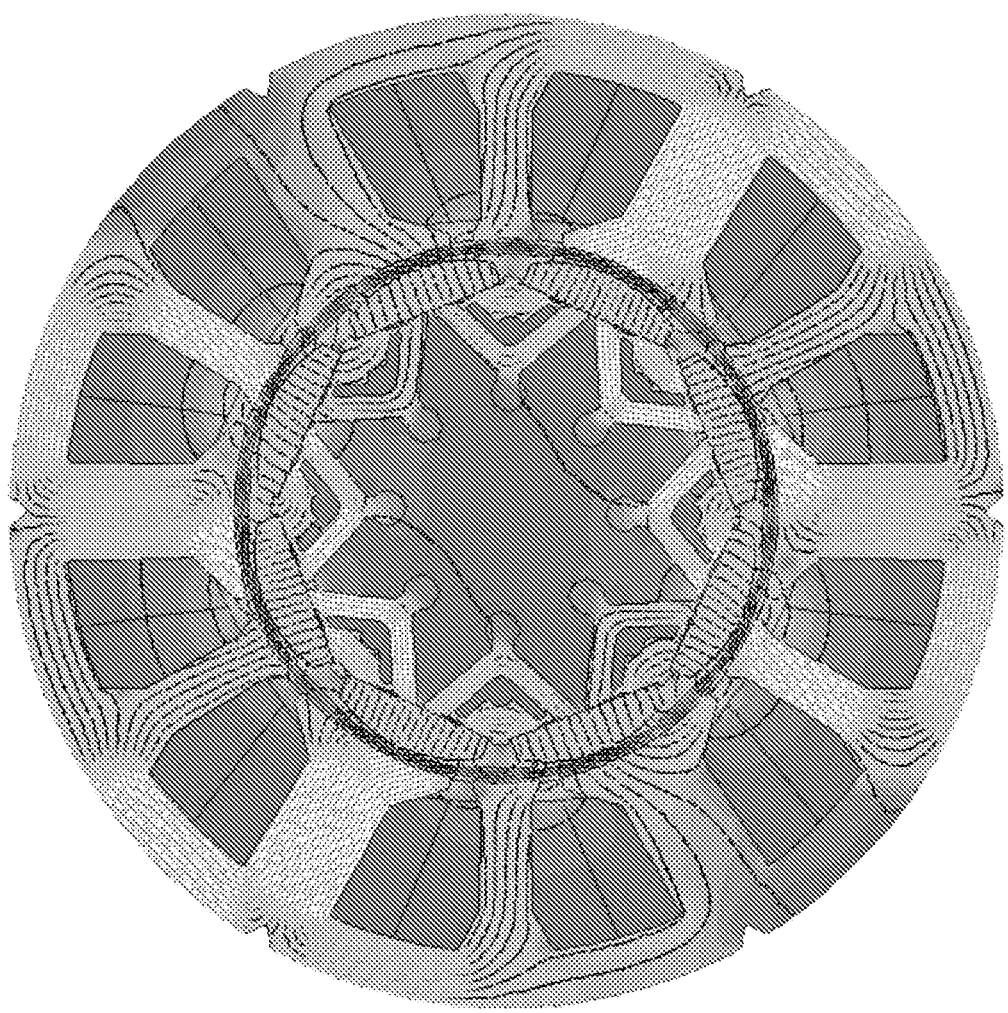

A second region 10 of the magnet support pieces is defined between the barrier region and the air gap that is located between the two ends of the magnets supported by the magnet support part. This includes a further cut out 11, in the form of a circular hole which is coalesced to the barrier region 8. This reduces the amount of material in the second region and provides a further barrier to q-axis flux. FIG. 4 shows an alternative in which the second cut out 11 is spaced from the barrier region.

The size of the second region 10 is selected such that at the peak rated flux of the motor the ends of the second region adjacent each magnet end are saturated, limiting the amount of flux that may flow through the magnet ends.

This later feature, combined with providing a bread loaf shape to each magnet helps prevent unwanted demagnetisation of the ends of the magnet, and with cogging and low torque ripple, something that SPM motors are prone to compared with interior permanent magnet motors.

The stacks of plates 13 are supported by a central spine 14 of lightweight plastic materials. The spine 14 is generally cylindrical and has axial grooves defining sockets 15 down the outer surface, one socket for each stack of plates. In turn each of the stacks is provided with a ligature 16 that has a dovetail shape.

The skilled person will appreciate that several modifications can be made to the embodiments whilst remaining within the scope of the present invention. The number of stator teeth, rotor magnets and the winding configuration can be varied, as can the exact shape of the barriers and the first and second regions whilst retaining the benefits of the claimed invention.

The invention claimed is:

1. A surface mounted permanent magnet (SPM) motor (1) comprising:
   a stator (2) comprising a plurality of poles (3) and a plurality of stator windings (4);
   a rotor (4) comprising a support assembly (5) and a plurality of permanent magnets (6) spaced circumferentially around the rotor, in which each permanent magnet is fixed to the outer surface of the support assembly,
   the rotor (4) and stator (2) being positioned about a common axis such that the stator poles (3) face the outer surface of the rotor (4) and the rotor can rotate around the shared axis,
   in which the support assembly (5) comprises a plurality of magnetically conductive magnet carriers (7), each circumferentially spaced from an adjacent magnet carrier, the magnet carriers (7) each having an outer face (8) that provides a segment of the outer face of the support assembly (5),
   each magnet (6) being supported by two adjacent magnet carriers (7) and each magnet carrier (7) supporting two magnets (6) of opposing polarity,
   in which each of the magnet carriers (7) comprises a central flux barrier region (8) of relatively low permeability that blocks q-axis flux flowing from the stator radially towards the rotor axis surrounded by regions of relatively high permeability, a first one (9) of those high permeability regions defining a continuous flux path that extends on the side of the barrier region (8) closest to the rotor axis and links a central region (9a) of each of the two magnets carried by the magnet carriers, and a second one (10) of the high permeability regions being located on the side of the barrier (8) nearest the stator (2) that defines a flux path that links the end regions of the two magnets (7).

2. A surface mounted permanent magnet (SPM) motor according to claim 1 in which the flux barrier (8) is V-shaped or part circular in shape when viewed along the axis of the rotor, with one end (8a) of the barrier region being located close to an underside of one of the magnets (6) supported by the magnet carrier (70) and the other end (8b) located close to the underside of another magnet (6) supported by the magnet carrier.

3. A surface mounted permanent magnet (SPM) motor according to claim 2 in which the first region (9) of relatively high permeability is V-shaped or of part circular shape to compliment the shape of the barrier region, an edge of the first region defining an innermost peripheral edge of the magnet support piece.

4. A surface mounted permanent magnet (SPM) motor according to claim 3 in which a locating feature or ligature is provided at the apex of the V-shaped first region, aligned radially with the centre of the gap between the magnets supported by the magnet support piece.

5. A surface mounted permanent magnet (SPM) motor according to claim 4 in which the rotor (4) comprises an elongate central spine (14) having outwardly facing sockets (15) that engage with the locating features or ligatures of the magnet carriers.

6. A surface mounted permanent magnet (SPM) motor according to claim 5 in which the spine (14) comprises a material that is non-ferromagnetic and having a lower weight that would be achievable using a solid rotor core of ferromagnetic material.

7. A surface mounted permanent magnet (SPM) motor according to claim 2 in which the apex of the barrier region (8) where V-shaped, or centre of the barrier region where part circular, is aligned radially with the centre of the gap between the two magnets supported by the magnet support piece.

8. A surface mounted permanent magnet (SPM) motor according to claim 1 in which the second region (10) includes a further barrier region (11) between the radially outer surface of the magnet carrier and the barrier region of relatively low permeability.

9. A surface mounted permanent magnet (SPM) motor according to claim 8 in which the further barrier region (11) is a hole, preferably circular, cut out of the magnet support piece.

10. A surface mounted permanent magnet (SPM) motor according to claim 9 in which the further barrier (11) and the barrier region (8) are coalesced at a single region comprising a u-shaped or V-shaped cut out with an enlarged circular hole nestled into the base of the v shape or u-shape on the side facing the stator.

11. A surface mounted permanent magnet (SPM) motor according to claim 1 in which the second region (10) of relatively high permeability is shaped and sized such that the material of the second region is saturated in the vicinity where it contacts the corners of the magnets that are supported by the magnet support piece, limiting the q-axis flux that can flow from the stator through the corners of the magnet and into the magnet support piece.

12. A surface mounted permanent magnet (SPM) motor according to claim 1 further comprising a raised rib (12) on the radially outer surface of the magnet carrier (7) that protrudes partially into the space between the ends of the two magnets supported by each magnet support piece.

13. A surface mounted permanent magnet (SPM) motor according to claim 1 in which each magnet carrier (7) comprises a laminated stack of magnet support pieces which each comprise a ferromagnetic plate (13).

14. A surface mounted permanent magnet (SPM) motor according to claim 13 in which each plate has an aligned grain that defines a preferential direction along which it is easier for flux to flow than in a direction orthogonal to that direction, in which the grain is aligned orthogonally to the axis of rotation of the rotor when looking along the radial centre line of the plate.

15. A surface mounted permanent magnet (SPM) motor according to claim 1 in which each magnet carrier (7) includes a recess on the outer circumferential surface in a region that is covered by a magnet that is filled with an adhesive to fix the magnet (6) in place.

* * * * *